2,909,444

SCREEN SETTLING SYSTEM

Peter Seats, Lake Hiawatha, and Leo V. Connolly, Jr., Rutherford, N.J., assignors to Thomas Electronics, Inc., Passaic, N.J., a corporation of New Jersey No Drawing. Application December 10, 1957
Serial No. 701,714

8 Claims. (Cl. 117—33.5)

This invention relates to a process for depositing luminescent material on a solid surface in order to form a luminescent screen. More particularly the invention relates to the production of a layer of luminescent material by settling materials from liquid suspensions wherein a suspension of the material to be settled is placed in a vessel containing a support and the material is allowed to settle through the liquid onto the support after which the supernatent liquid is decanted or siphoned off leaving a layer of the luminescent material on the support. The invention relates particularly but not exclusively to the formation of screens of luminescent material comprising a support with a layer of phosphors settled thereon, for example, the luminescent screens of cathode ray tubes, luminescent lamps or X-ray apparatus. In the case of cathode ray tubes, the vessel may be the envelope of the tube and the support may be the end or face of the tube.

According to one currently used method of forming such luminescent coatings, the surface upon which the screen is to be formed is covered with a colloidal silica gel and an aqueous dispersion of luminescent material is then distributed over this colloidal silica gel and is allowed to settle therethrough and deposit upon the surface. The excess silica gel is then removed and the screen dried. Such a process is described in detail in United States patent to Tidik No. 2,451,590. It is to be noted that this process involves gelation or structuration and that if the colloidal gel is allowed to stand for an excess amount of time the gel becomes so viscous that it cannot be readily poured off.

Another currently used method of forming a luminescent screen involves the formation of a cushion liquid containing an electrolyte to which is added a phosphor mixed with a silicate which reacts with the electrolyte to form a flocculent silicate suspension through which the phosphors settle to form a uniform coat. The liquid is then decanted and the coating is dried with flocculent silicate and some unreacted silicate serving as an adhesive to hold the phosphor particles in place during the decanting and subsequent heating steps. This process is basically different from the colloidal silica gel process in that there is no structuration but rather a slow precipitation, coagulation or flocculation forming aggregates which separate from solution.

Silicate systems of the foregoing types have achieved widespread use since they produce stronger screens than the processes which were used theretofore. However, a major disadvantage with silicate processes is that the alkali silicates readily etch or stain glass thus creating internal neck and external face cleaning problems. A further disadvantage lies in the relatively high cost of the material, since it must be very carefully made in order to insure reproducible behavior.

In addition to the silicate processes certain aqueous non-silicate and some non-aqueous processes have been proposed. These do not enjoy any widespread use, however, due to inferior screen adhesion or other inferior screen properties or high cost. Non-aqueous systems such as those employed with special water-sensitive phosphors are also usually hazardous in addition to being very costly.

It is accordingly a primary object of the present invention to provide an improved aqueous system process for depositing luminescent material on a solid surface to form a luminescent screen.

It is another object of the invention to provide an aqueous system screen settling process of the foregoing type utilizing as a binding agent an inorganic water insoluble reaction product resulting from the reaction between an inorganic polymeric compound which may be dissolved in water and an agent which causes the separation of the polymer from the aqueous phase.

It is another object of the invention to provide an aqueous screen settling process of the foregoing type utilizing potassium metaphosphate as the polymer which may be dissolved in water.

These and further objects and advantages of the invention will become more apparent upon reference to the following detailed description of the process and of the best mode of carrying it out.

According to the process of the invention, we have found that a very satisfactory luminescent screen may be formed both economically and quickly by dissolving potassium metaphosphate in water with the aid of a soluble sodium ammonium or lithium salt and reacting the resulting solution, in the presence of the phosphor powder, with a solution of a group II metal salt to form an insoluble product, some of which deposits with the phosphor powder to form an adherent and coherent uniform layer on the surface.

The phosphor which is to form the luminescent screen is preferably mixed with the potassium metaphosphate solution and is then added to the group II metal salt solution. Satisfactory results, however, are also obtained by mixing the phosphor powder with the group II metal salt solution first and then adding this to the potassium metaphosphate solution. The screen formed in this process has an extraordinary wet strength and the process is more economical than the silicate process and produces no glass etching problems. Potassium metaphosphate possesses an unusual ability to polymerize readily and may have, for example, a molecular weight on the order of 200,000.

It is sometimes beneficial, depending on the characteristics of the phosphor employed or the screen desired, to operate the process at a relatively high pH, for example, 9.5. In order to achieve this, a small admixture of an alkali such as sodium hydroxide may be made. The necessity for, and quantity of, the free alkali addition will also be determined by the type of sodium, ammonium or lithium salt employed to solubilize the potassium metaphosphate. It is to be understood, however, that the pH, concentration range, temperature and other parameters are not highly critical for the production of satisfactory screens; in fact, the permissible latitude in the process as a whole is very wide.

In a specific example in the formation of a luminescent screen in a television tube, a 21 inch, 110° tube envelope was supported in a vertical position with the face plate down. 17 liters of an 0.4% (w./w.) magnesium sulfate (hydrated) solution was poured in to form a so-called cushion liquid. Over this cushion liquid was then added through a funnel with a rose outlet one liter of a solution containing the following ingredients:

| | Gms. |
|---|---|
| Potassium metaphosphate | 2.70 |
| Sodium borate (Borax) | 4.05 |
| Sodium hydroxide | 0.20 |
| Phosphor | 6.0 |

The phosphor powder was allowed to settle to the bottom of the tube over a period of 15 to 20 minutes and the supernatent liquid was then decanted off. The resulting screen was then dried with a current of air and formed a tenaciously adherent coating.

From the foregoing example, it will be seen that screens formed according to the method of the invention may be produced in a relatively short period of time from low-cost chemicals. The phosphors in the screen are held strongly in place by the reaction product and there is no tendency to glass etching.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of forming a luminescent screen on a solid surface comprising the steps of providing an electrolyte comprising a solution of a highly ionized group II metal salt over said surface, mixing with said electrolyte a solution of potassium metaphosphate in water, which solution has a luminescent material suspended therein, to cause the precipitation of an insoluble product on said solid surface to bind said luminescent material to said solid surface, and removing excess liquid from said solid surface.

2. A method of forming a luminescent screen on a solid surface comprising the steps of providing an electrolyte comprising a solution of a highly ionized group II metal salt over said surface, mixing with said electrolyte a solution of potassium metaphosphate in water, which solution has a luminescent material suspended therein, to cause the precipitation of an insoluble product on said solid surface to bind said luminescent material to said solid surface, and removing excess liquid from said solid surface.

3. A method of forming a luminescent screen on a solid surface comprising the steps of providing an electrolyte comprising a solution of a highly ionized group II metal salt over said surface, dissolving potassium metaphosphate in water with the aid of a soluble salt selected from the group consisting of sodium, ammonium and lithium, introducing said metaphosphate solution and a luminescent material into said solution of an alkaline earth metal salt to cause the precipitation of an insoluble product on said solid surface to bind said luminescent material to said solid surface, and removing excess liquid from said solid surface.

4. A method of forming a luminescent screen on a solid surface comprising the steps of providing an electrolyte comprising a solution of magnesium sulfate over said surface, dissolving potassium metaphosphate in water with the aid of a soluble salt selected from the group consisting of sodium, ammonium and lithium, introducing said metaphosphate solution and a luminescent material into said solution of an alkaline earth metal salt to cause the precipitation of an insoluble product on said solid surface to bind said luminescent material to said solid surface, and removing excess liquid from said solid surface.

5. A method of forming a luminescent screen on a solid surface comprising the steps of providing an electrolyte comprising a solution of magnesium sulfate over said surface, dissolving potassium metaphosphate in water with the aid of sodium borate, introducing said metaphosphate solution and a luminescent material into said electrolyte to cause the precipitation of an insoluble product on said solid surface to bind said luminescent material to said solid surface, and removing excess liquid from said solid surface.

6. A method of forming a luminescent screen on a solid surface comprising the steps of forming a solution of potassium metaphosphate, sodium borate and a hydroxide in water, introducing said metaphosphate solution and a luminescent material into an electrolyte comprising a solution of a highly ionized group II metal salt to cause the precipitation of an insoluble product on said solid surface to bind said luminescent material to said solid surface, and removing excess liquid from said solid surface.

7. A method of forming a luminescent screen on a solid surface comprising the steps of settling a luminescent material through an admixture of an aqueous solution of potassium metaphosphate and an electrolyte comprising a solution of a highly ionized group II metal salt, and removing the excess of liquid from said solid surface.

8. A method of forming a luminescent screen on a solid surface comprising the steps of forming an admixture of an aqueous solution of potassium metaphosphate and an electrolyte comprising a solution of a highly ionized group II metal salt, settling a phosphor from said admixture, and removing the excess of liquid from said solid surface.

References Cited in the file of this patent

UNITED STATES PATENTS

| | | |
|---|---|---|
| 2,376,437 | Leverenz | May 22, 1945 |
| 2,451,590 | Tidik et al. | Oct. 19, 1948 |
| 2,684,306 | Brewer et al. | July 20, 1954 |
| 2,697,668 | Crosby et al. | Dec. 21, 1954 |
| 2,704,726 | Markoski | Mar. 22, 1955 |